Aug. 9, 1927.

E. FULDA 1,638,570

POLISHING DEVICE

Filed Sept. 13, 1924  2 Sheets-Sheet 1

INVENTOR
Edward Fulda
BY
Townsend & Decker
ATTORNEYS

Aug. 9, 1927.

E. FULDA

POLISHING DEVICE

Filed Sept. 13, 1924

INVENTOR
Edward Fulda
BY
Townsend + Decker
ATTORNEYS

Patented Aug. 9, 1927.

1,638,570

UNITED STATES PATENT OFFICE.

EDWARD FULDA, OF NEW YORK, N. Y.

POLISHING DEVICE.

Application filed September 13, 1924. Serial No. 737,520.

My invention has for its object the production of a simple and effective apparatus or machine adapted to be driven by any suitable power and also adapted to polish and remove rust or scale or any objectionable foreign matter from wire or other objects. The apparatus may be readily employed to perform other functions and in its application the invention will be understood not to be limited to the performance of the specific function stated.

Other and further objects and advantages of the invention will appear from the accompanying description, the invention consisting in the novel apparatus and parts thereof hereinafter more particularly described and then specified in the claims.

The accompanying drawings show a practical embodiment of the invention in which.

Figure 1:
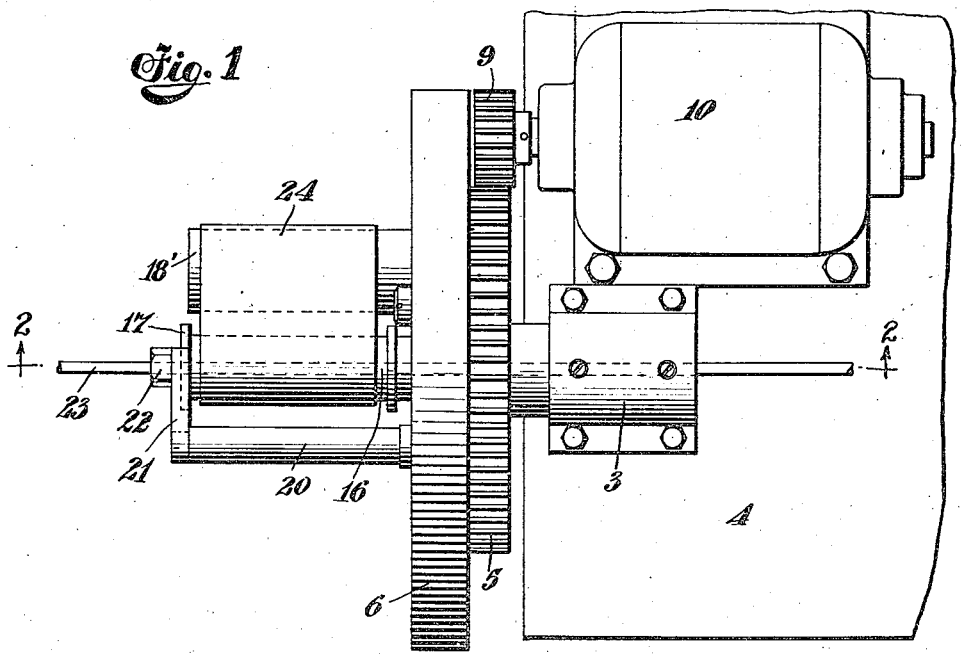
Fig. 1 is a plan view of the apparatus.
Figure 2:
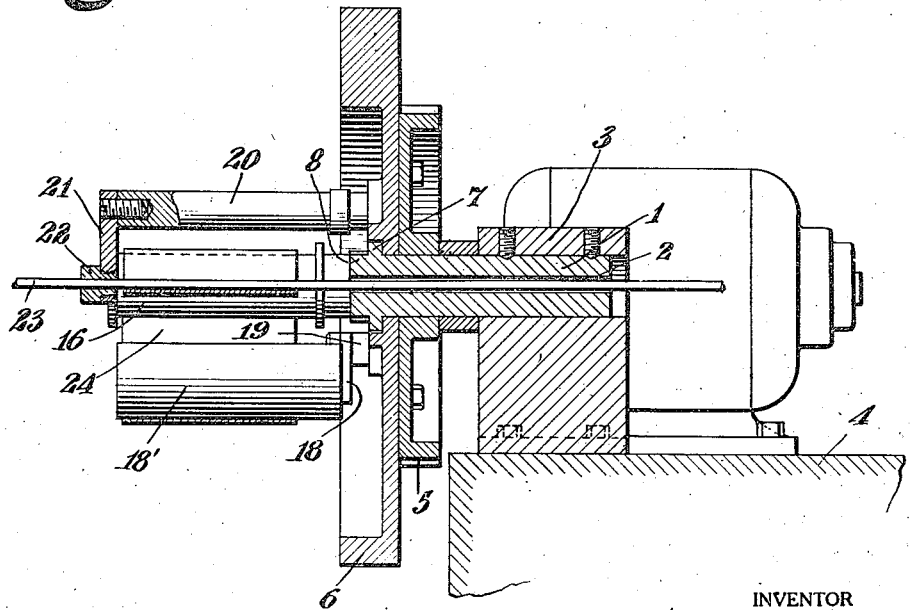
Fig. 2 is a horizontal section on the line 2—2 of Fig. 1.
Figure 3:
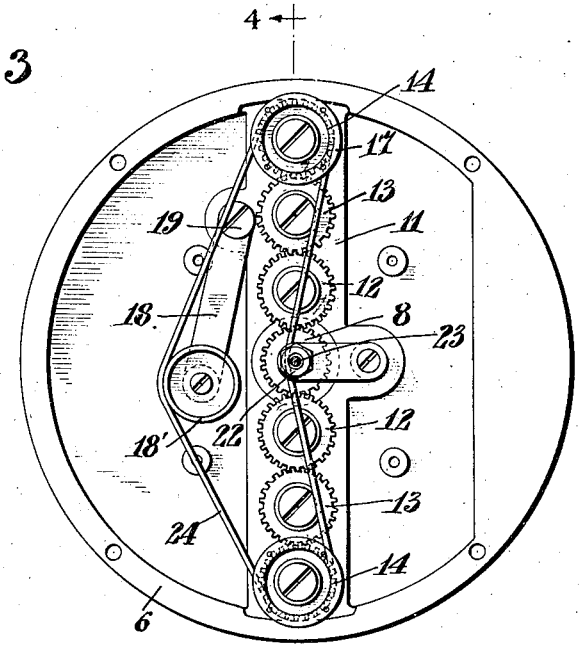
Fig. 3 is a front elevation of the apparatus showing the cover plate removed.
Figure 4:
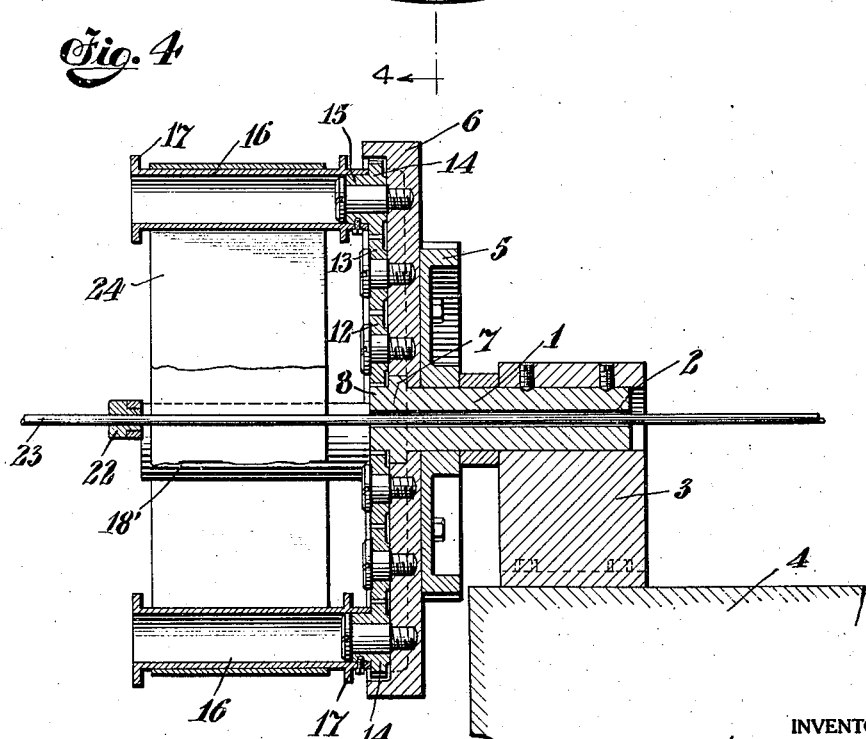
Fig. 4 is a vertical cross-section on the line 4—4 of Fig. 3.

Referring in detail to the several figures of the drawing:

1 indicates a stationary shaft provided with an opening 2 extending longitudinally and centrally therethrough, said shaft being non-rotatably supported in a suitable bearing block 3 which is bolted or otherwise secured to a table 4. The forward end of said shaft extends centrally through a gear 5 and through a disk housing 6, said disk housing being shown with its front cover plate removed for the purpose of clearly illustrating the enclosed mechanism. The shaft 1 is provided with an annular flange 7 to prevent the forward removal of the disk housing from said shaft, the forward end of said shaft also having a gear 8 fixed thereon. The gear 5 is secured by bolts as shown or otherwise to the rear face of the disk housing 6, said gear 5 meshing with a smaller gear 9 which is carried on the end of the shaft of a motor 10 suitably bolted to the table 4.

The inner face of the disk housing is provided with a plate 11 extending diagonally thereacross and secured thereto in any desirable manner. Pivotally mounted on said plate by suitable pivots or pins extending or screwed into the plate 11 and wall of the disk 6 are gears 12 meshing with the fixed gear 8, gears 13 meshing with the gears 12 and gears 14 meshing with the gears 13, said gears 14 being provided with outwardly extending annular flanges 15 to each of which is secured by the screws as shown or otherwise a pulley 16 rotatable with said gears, said pulleys being positioned adjacent the edge of the disk and diametrically opposed to each other. The pulleys 16 are also provided at their inner and outer ends with outwardly extending annular flanges 17.

18 indicates an arm which is pivoted to an extension on the plate 11 by a pivot pin 19. Said arm 18 carries a rotatable tube 18' on the end thereof extending outwardly in the direction of and parallel to the pulleys 16. A rigid shaft 20 is also provided, which shaft is fastened in any desirable manner to a suitable extension on the plate 11, said shaft having an arm 21 secured to the end thereof and extending at right angles thereto. The arm is provided with a perforated nut 22 screwed therein the perforation of which is preferably in alignment with the longitudinal opening in the shaft 1 and which provides a guide for a wire 23 which may be wound on any suitable reel (not shown) which wire also extends through said longitudinal opening. An endless belt made of any abrasive material is provided which belt extends over the pulleys 16 and over the tube 18' and which is adapted to engage the wire 23.

When the motor is started the disk housing will rotate in an obvious manner, motion being transmitted through the gears 9 and 5 to the disk. Inasmuch as the gear 8 is fixed the gears 12 will rotate therearound thereby causing rotation of the gears 13 and 14 and in turn causing rotation of the flanges 15 and pulleys 16 which are secured thereto. This effects the revolving of the abrasive belt around the pulleys and over the tube 18', the arm 18, meanwhile having been thrown outwardly on its pivot away from the center of the disk by centrifugal action to effect a tightening of the abrasive belt 24 and causing it to firmly engage the wire 23. As the disk 6 rotates, the belt 24 at all times engages the wire and at the same time revolves therearound so that all sides thereof will be cleaned and polished. Inasmuch as the belt itself is constantly travelling around the pulleys and the belt tightener, moreover, the cleaning and polishing action thereof is enhanced and as the portion thereof which engages the wire is constantly changing wear on any part thereof is obviated.

What I claim as my invention is:

1. In an apparatus of the character described, a rotatable member, a travelling endless belt carried thereby and a belt tightener for said belt adapted to be thrown into operative position by the centrifugal action of said rotatable member.

2. In an apparatus of the character described, a rotatable disk, pulleys mounted on said disk and extending outwardly therefrom and adapted to be rotated by rotation of said disk, an endless belt engaging said pulleys and extending thereover and a pivoted belt tightener carried by said disk and adapted to be thrown into operative position against said belt by the centrifugal action of said disk.

3. In an apparatus of the character described, a rotatable disk, belt supporting members carried thereby, an endless belt passing over said belt supporting members and a belt tightener comprising an arm pivoted to said disk and provided with a rotatable tube adapted to engage said belt, said belt tightener being adapted to be thrown into operative position to tighten said belt by the centrifugal action of said rotatable disk.

4. In an apparatus of the character described, a stationary shaft provided with an opening extending longitudinally therethrough, a rotatable disk mounted upon said shaft, rotatable pulleys mounted on said disk, means for causing one of said pulleys to be rotated by rotation of said disk, a flexible member encircling said pulleys and a guide secured to and projecting from said disk, said guide having a guideway in alignment with the opening in said shaft.

Signed at New York in the county of New York and State of New York this 12th day of September, A. D. 1924.

EDWARD FULDA.